US010221879B2

(12) United States Patent
Mugan

(10) Patent No.: US 10,221,879 B2
(45) Date of Patent: Mar. 5, 2019

(54) PANEL MOUNT FASTENER HAVING AN OUTER SLEEVE WITH A COLLAPSIBLE END PORTION

(71) Applicant: Amphenol Corporation, Wallingford, CT (US)

(72) Inventor: Shan Mugan, Markham (CA)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 15/727,285

(22) Filed: Oct. 6, 2017

(65) Prior Publication Data

US 2018/0100532 A1 Apr. 12, 2018

Related U.S. Application Data

(60) Provisional application No. 62/406,150, filed on Oct. 10, 2016.

(51) Int. Cl.
| *H01R 13/60* | (2006.01) |
| *H01R 13/66* | (2006.01) |
| *F16B 21/08* | (2006.01) |
| *H01R 13/518* | (2006.01) |
| *F16B 5/02* | (2006.01) |

(Continued)

(52) U.S. Cl.
CPC .......... *F16B 21/086* (2013.01); *F16B 5/0208* (2013.01); *F16B 19/02* (2013.01); *H01R 13/518* (2013.01); *F16B 1/04* (2013.01)

(58) Field of Classification Search
CPC ............ H01R 12/7005; H01R 12/7035; H01R 13/514; H01R 13/518; H01R 13/629; H01R 13/6595; F16B 21/086; F16B 5/0208; F16B 19/02; F16B 5/0642; F16B 5/065; F16B 19/1081; H05K 7/142; Y10S 411/908; Y10S 411/913; Y10T 24/039; Y10T 24/42; Y10T 24/45487; Y10T 403/75
USPC ...... 439/51, 378, 567; 174/138 D; 264/48.1, 264/48.4, 49; 269/48.1, 48.4, 49
See application file for complete search history.

(56) References Cited

U.S. PATENT DOCUMENTS

| 3,854,374 A | 12/1974 | Boyle et al. |
| 4,784,550 A * | 11/1988 | Wollar ................ F16B 19/1081 411/32 |

(Continued)

OTHER PUBLICATIONS

International Search Report and Written Opinion issued in PCT/US17/55752 dated Dec. 12, 2017.

*Primary Examiner* — Chandrika Prasad
(74) *Attorney, Agent, or Firm* — Blank Rome LLP

(57) ABSTRACT

A fastener and method for mounting a connector to a panel, the fastener having an outer sleeve housing having a mount bushing portion and a locking portion with a collapsible end, and an inner pin member received in the outer sleeve housing and axially moveable therein between locked and unlocked positions. The inner pin member has a body with a head end that cooperates with the mount bushing portion of the outer sleeve housing and a locking end that cooperates with the locking portion of the outer sleeve portion. When the inner pin member is in the unlocked position, the collapsible end of the locking portion of the outer sleeve housing is allowed to collapse. When the inner pin member is in the locked position, the locking end of the inner pin member prevents collapse of the collapsible end of the locking portion of the outer sleeve housing.

19 Claims, 2 Drawing Sheets

(51) Int. Cl.
*F16B 19/02* (2006.01)
*F16B 1/04* (2006.01)

(56) References Cited

U.S. PATENT DOCUMENTS

| | | | |
|---|---|---|---|
| 5,240,361 | A | 8/1993 | Armstrong et al. |
| 5,845,898 | A | 12/1998 | Halder et al. |
| 6,056,283 | A | 5/2000 | Gage et al. |
| 7,713,010 | B2 * | 5/2010 | Cheng .................. F16B 13/003 411/29 |
| 8,585,337 | B1 | 11/2013 | Dang |

* cited by examiner

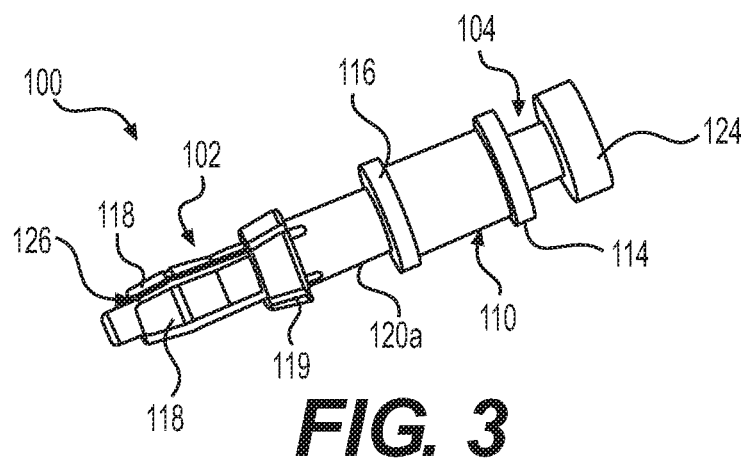
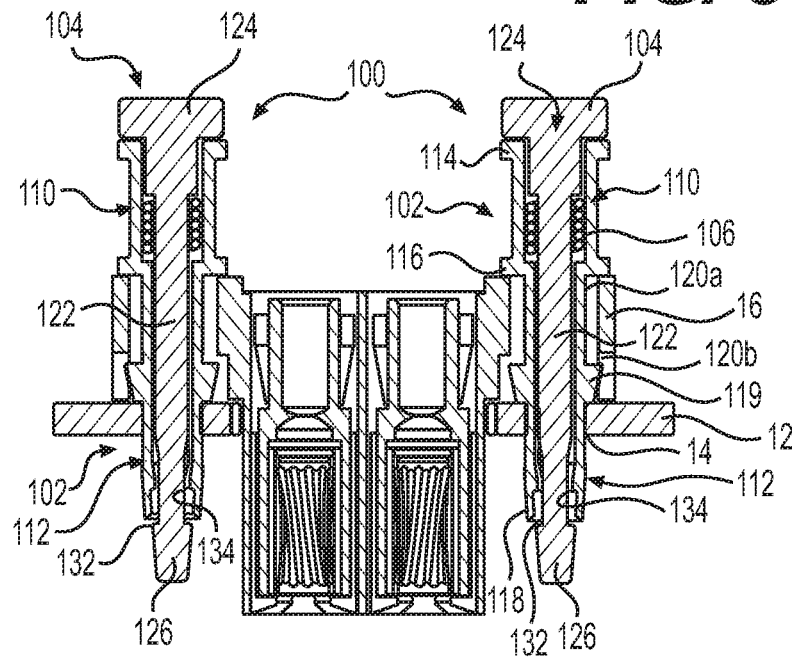
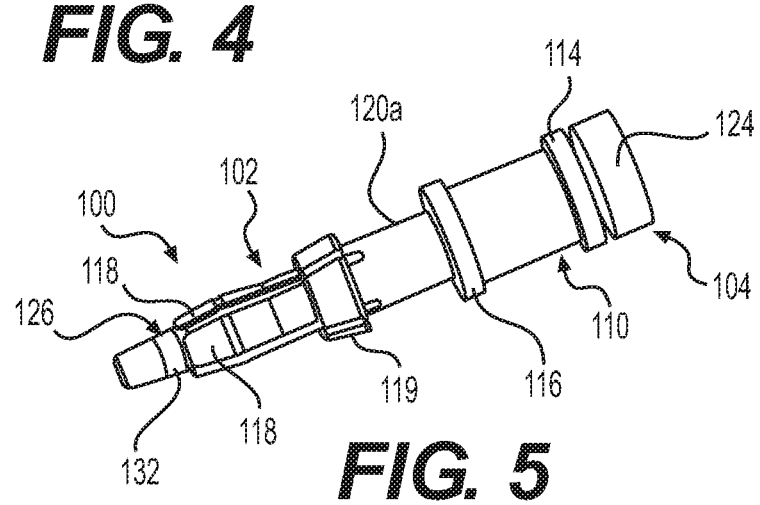

US 10,221,879 B2

PANEL MOUNT FASTENER HAVING AN OUTER SLEEVE WITH A COLLAPSIBLE END PORTION

RELATED APPLICATION

This application claims the benefit of U.S. provisional application No. 62/406,150, entitled Panel Mount Fastener, filed on Oct. 10, 2016, the entirety of which is incorporated by reference.

FIELD OF THE INVENTION

The present invention relates to fastener for quickly and easily mounting an electrical connector to a panel without using a tool, a connector assembly with the fastener, and a method for mounting the same.

BACKGROUND OF THE INVENTION

Electrical connectors, such as power connectors, are often mounted to a panel, such as a panel that is part of a piece of equipment or the like. Such mounting, however, can be difficult in tight spaces particularly when a tool must be used, which is common for conventional mounting of electrical connectors. Also, tolerances in mounting may be tight therefore further increasing the time and difficulty of mounting the connector.

Therefore, a need exists for a fastener and method that allows quick and easy mounting of an electrical connector to a panel where no tool is needed for the mounting and sufficient float is provided to further facilitate the mounting.

SUMMARY OF THE INVENTION

Accordingly, the present invention may provide a fastener for mounting a connector to a panel that comprises an outer sleeve housing that has a mount bushing portion and a locking portion, where the locking portion has a collapsible end, and an inner pin member that is received in the outer sleeve housing and axially moveable with respect to the outer sleeve housing between locked and unlocked positions. The inner pin member has a body with a head end that cooperates with the mount bushing portion of the outer sleeve housing and a locking end that cooperates with the locking portion of the outer sleeve portion. When the inner pin member is in the unlocked position, the locking end thereof is clear of the collapsible end of the locking portion of the outer sleeve housing such that the collapsible end is allowed to collapse. When the inner pin member is in the locked position, the locking end thereof is received in the collapsible end of the outer sleeve housing, thereby preventing collapse of the collapsible end.

In a preferred embodiment, a spring is disposed in the mount bushing portion of the outer sleeve housing in association with the inner pin member so that the spring biases the inner pin member in the locked position. The spring may be compressed by the head end of the inner pin member toward the locking portion of the outer sleeve housing when the inner pin member is in the unlocked position and the spring may be extended when the inner pin member is in the locked position to push the head end away from the locking portion of the outer sleeve housing.

In certain embodiments, the collapsible end of the locking portion of the outer sleeve housing may include flexible fingers formed by longitudinal slots in the locking portion; the locking end of the inner pin member may include a shoulder having outer diameter sized to prevent collapse of the flexible fingers when the locking end of the inner pin member is received in the locking position; and the mount bushing portion of the outer sleeve housing may include opposing first and second flanges where the first flange cooperates with the head end of the inner pin member when the inner pin member is moved between the locked and unlocked positions. In other embodiments, the outer sleeve housing may include an annular recessed area between the mount bushing portion and the locking portion of the outer sleeve housing; and the outer sleeve housing may include a stopping member having an outer diameter that is wider than the locking portion.

The present invention may also provide a connector assembly that comprises a connector that has a housing with at least one mounting bore and at least one fastener receivable in the at least one mounting bore for mounting the connector to a panel. The at least one fastener of the connector assembly may include an outer sleeve housing that has a mount bushing portion and a locking portion, where the locking portion has a collapsible end, and an inner pin member that is received in the outer sleeve housing and axially moveable with respect to the outer sleeve housing between locked and unlocked positions. The inner pin member has a body with a head end that cooperates with the mount bushing portion of the outer sleeve housing and a locking end that cooperates with the locking portion of the outer sleeve portion. When the inner pin member is in the unlocked position, the locking end thereof is clear of the collapsible end of the locking portion of the outer sleeve housing such that the collapsible end is allowed to collapse. When the inner pin member is in the locked position, the locking end thereof is received in the collapsible end of the outer sleeve housing, thereby preventing collapse of the collapsible end.

In a preferred embodiment, a spring is disposed in the fastener's mount bushing portion of the outer sleeve housing in association with the inner pin member so that the spring biases the inner pin member in the locked position. The spring of the connector assembly may be compressed by the head end of the inner pin member toward the locking portion of the outer sleeve housing when the inner pin member is in the unlocked position and the spring may be extended when the inner pin member is in the locked position to push the head end away from the locking portion of the outer sleeve housing.

In certain embodiments of the connector assembly, the collapsible end of the locking portion of the outer sleeve housing may include flexible fingers formed by longitudinal slots in the locking portion; the locking end of the inner pin member may include a shoulder having outer diameter sized to prevent collapse of the flexible fingers when the locking end of the inner pin member is received in the locking position; and the mount bushing portion of the outer sleeve housing may include opposing first and second flanges where the first flange cooperates with the head end of the inner pin member when the inner pin member is moved between the locked and unlocked positions and the second flange cooperates with the housing of the connector at the at least one mounting bore.

In one embodiment of the connector assembly, the fastener's outer sleeve housing includes an annular recessed area between the mount bushing portion and the locking portion of the outer sleeve housing where the annular recessed area defines a space between the outer sleeve housing of the fastener and the mounting bore of the connector that provides radial and axial float for the fastener inside of the mounting bore. In another embodiment, the fastener's outer sleeve housing includes a stopping member adjacent the annular recessed area and the stopping member has an outer diameter that is configured to be wider than a hole in the panel through which the fastener is inserted.

The present invention may further provide a method of mounting a connector to a panel, comprising the steps of: providing at least one fastener for mounting the connector to the panel, the fastener comprising an outer sleeve housing having a mount bushing portion with a spring and a locking portion with a collapsible end, and an inner pin member received in the outer sleeve housing and axially moveable therein, and the inner pin member having a body with a head end and a locking end; pushing the head end of the inner pin member toward the locking portion of the outer sleeve housing, thereby compressing spring until the locking end of the inner pin member is clear of the collapsible end of the outer sleeve housing; after the step of pushing the head end of the inner pin, inserting the fastener through a mounting bore of a connector and through a corresponding mounting hole in the panel such that the collapsible end of the locking portion of the outer sleeve housing is on a side of the panel opposite the mount bushing portion of the outer sleeve member; and after the step of inserting the fastener through the mounting hole of the panel, releasing the head end of the inner pin member, thereby allowing the spring to expand and push the head end away from the panel until the locking end of the inner pin member resides inside of the collapsible end of the locking portion of the outer sleeve housing to prevent collapse of the locking portion, thereby locking the fastener and securing the connector on the panel.

In certain embodiments of the method of the present invention, the outer sleeve housing includes opposing first and second flanges and the spring is disposed between the first and second flanges, the head end abuts the first flange when pushing the head end towards the locking portion of the outer sleeve housing, and the second flange rests on a housing of the connector at the mounting bore. In one embodiment of the method of the present invention, the collapsible end includes flexible fingers formed by longitudinal slots in the locking portion, and the locking end of the inner pin member has a shoulder with an outer diameter sized to prevent collapse of the flexible fingers when the fastener is locked. In another embodiment of the method of the present invention, the fastener floats in a space between the outer sleeve housing and the mounting bore of the connector that is defined by an annular recessed area located between the mount bushing portion and the locking portion of the outer sleeve housing. In still another embodiment of the method of the present invention, after locking the fastener, pushing the head end of the inner pin member against the bias of the spring until the locking end of the inner pin member is clear of the collapsible end of the locking portion, thereby unlocking the fastener to release the connector mounted to the panel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures:

FIG. 3 is a perspective view of the panel mount fastener according to the present invention, showing the panel mount fastener in the locked position, as shown in FIG. 2;

FIG. 4 is a cross-sectional view similar to FIG. 2, showing the panel mount fasteners in an unlocked position; and FIG. 5 is a perspective view of the panel mount fastener according to the present invention, showing the panel mount fastener in the unlocked position, as shown in FIG. 4.

DETAILED DESCRIPTION OF THE INVENTION

Figure 1:
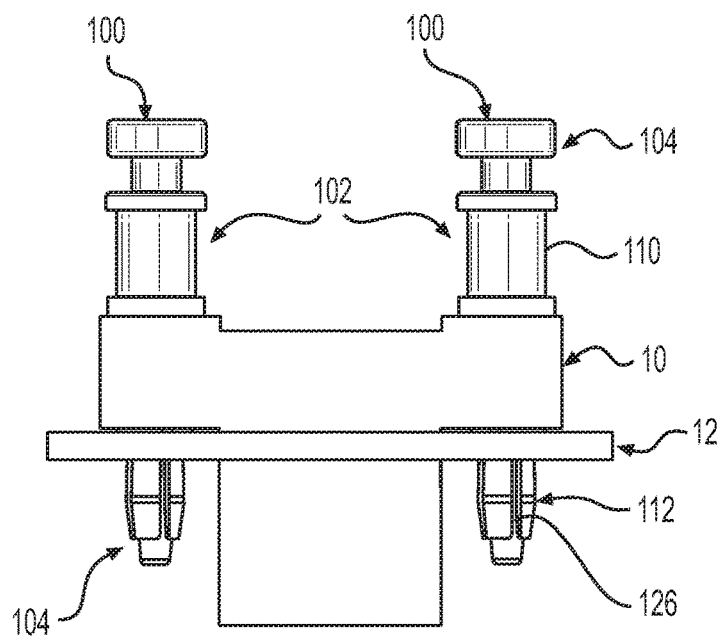
FIG. 1 is a plan view of a panel mount fastener according to an exemplary embodiment of the present invention, showing two of the fasteners of the present invention used to mount an electrical connector to a panel.

Referring to FIGS. 1-5, the present invention relates to a panel mount fastener 100 designed to securely hold an electrical connector 10, such as a power connector, in place on a panel 12 and disconnect the same, in a quick and easy manner. The advantage of the fastener 100 of the present invention is that it does not require the use of a tool to install the connector 10 in place or remove it from the panel 12. Instead, the installer simply pushes the fastener 100 into place to engage the panel 12, such as by snapping into a mounting hole 14 of the panel 12, and releases to lock the fastener 100 to mount the connector 10. The fastener 100 preferably includes a locking mechanism that is configured to allow easy lock and unlock of the fastener 100 when mounting and dismounting the electrical connector from the panel 12. The fastener 100 of the present invention is further advantageous because it provides float for the connector 10 while it is in place mounted on the panel 12.

As seen in FIGS. 1-5, two fasteners 100 are preferably used for mounting the connector 10 to the panel 12, although any number of fasteners 100 may be used including just one. Each fastener 100 may engage a mounting bore 16 of the connector's housing to mount the connector 10. At least one fastener 100 and the connector 10 form a connector assembly of the present invention.

Fastener 100 of the present invention generally includes an outer sleeve housing 102 that receives an inner pin member 104 which is axially movable with respect to outer sleeve housing 102 between a locked position (FIGS. 1-3) and an unlocked position (FIGS. 4 and 5). Outer sleeve housing 102 and inner pin member 104 may be formed of any plastic or metal material. A spring 106 is preferably provided between outer sleeve housing 102 and inner pin member 104 for biasing inner pin member 104 in the locked position.

Outer sleeve housing 102 includes a mount bushing portion 110 at one end and a locking portion 112 at the other end. Mount bushing portion 110 includes opposite outwardly extending annular flanges 114 and 116. In a preferred embodiment, the spring 106 is disposed between the flanges 114 and 116. Flange 116 generally abuts connector 10 at its mounting bore 16 and locking portion 112 engages the mounting hole 14 of the panel 12. Locking portion 112 may have a collapsible end 118 to facilitate the locking and unlocking of fastener 100. In a preferred embodiment, the collapsible end 118 may comprise, for example, a plurality of collapsible fingers formed by a plurality of longitudinal slots in the locking portion 112 of outer sleeve housing 102 (FIG. 3). Collapsible end 118 may have any flexible structure that can collapse when fastener 100 is inserted into or removed from the mounting hole 14 of the panel 12. Recessed areas 120a and 120b in the outer sleeve housing 102 between mount busing portion 110 and locking portion 112 define a space between outer sleeve housing 102 and the housing's mounting bore 16 to provide axial and radial float for the connector 10 when mounted to the panel 12 via fastener 100. A stop member 119 may be provided adjacent recessed area 120b for providing a stop against the panel 12 when inserting fastener 100 into the mounting hole 14 of the panel 12. As such, the outer diameter of the stop member 119 is preferably wider than locking portion 112 in general and the larger than the diameter of the panel's mounting hole 14, as best seen in FIGS. 2 and 4.

Inner pin member 104 includes a body 122 which extends through outer sleeve housing 102. Body 122 has a head end 124 at one end that cooperates with the mount bushing portion 110 of outer sleeve housing 102 and a locking end 126 at the other end that cooperates with locking portion 112 of outer sleeve housing 102. Head end 124 may include a depression part 128 that has a diameter wider than the flange 114 of outer sleeve housing 102 and an insert part 130 received in mount bushing portion 110 of outer sleeve housing 102. Locking end 126 includes an outer diameter that defines a shoulder 132 (FIG. 2) sized to prevent collapse of fingers 118 of the locking portion 112 of outer sleeve housing 102. The fingers 118 preferably form an inner rib 134 that abuts or nearly abuts the pin member's shoulder 132 when fastener 100 is locked, as best seen in FIG. 2. Spring 106 is preferably received in an annular area 136 between and the inner surface of mount busing portion 110 of outer sleeve housing 102 and the pin member's body 122.

Figure 2:
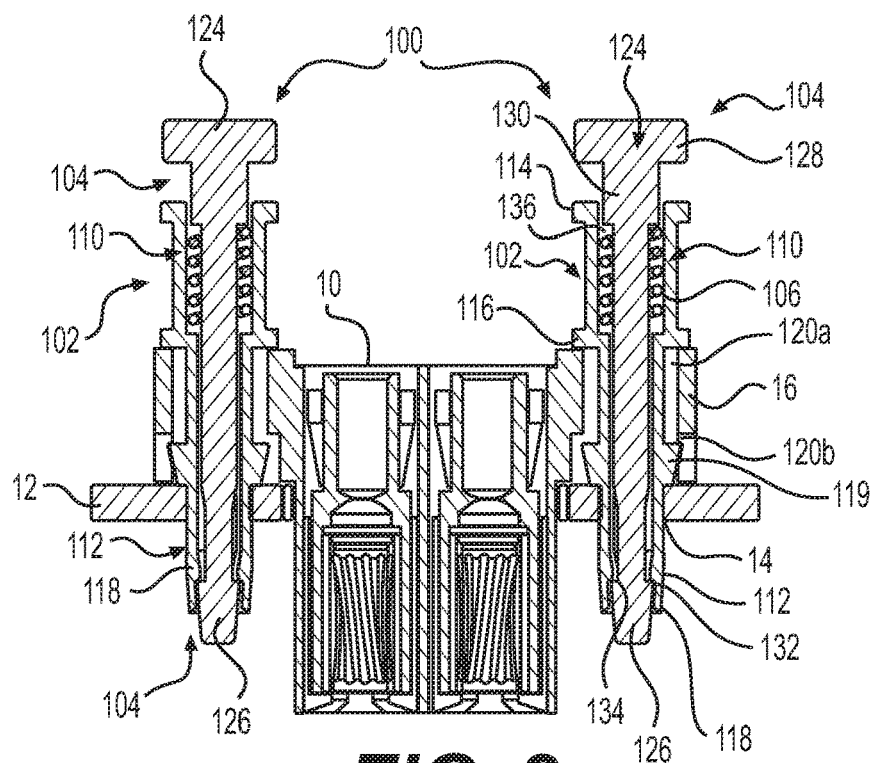
FIG. 2 is a cross-sectional view of FIG. 1, showing the panel mount fasteners in a locked position.

FIGS. 1-3 illustrate the fasteners 100 in the locked position for holding the connector 10 in place in the panel 12. Each fastener 100 is inserted into a respective mounting bore 16 of the connector 10 and snapped into a respective panel hole 14. In this locked position, the inner pin member 104 is positioned such that it's head end 124, and particularly, depression part 128, is spaced from mount bushing portion 110 of outer sleeve housing 102; and its locking end 126, particularly shoulder 132, rests inside of the outer sleeve housing's fingers 118 to prevent collapse thereof, as best seen in FIG. 2. That in turn prevents removal of the fastener 100 from the panel hole 14 due to the non-collapsed fingers 118 engagement with the panel 12 and its mounting hole 14. Spring 106 operates to extend and bias fastener 100 in its locked position by biasing the pin member's head end 124 away from locking portion 112 of outer sleeve housing 102 to maintain locking end 126 inside of fingers 118. Spring 106 may abut insertion part 130 of head end 124 to push head end 124 away from outer sleeve housing 102.

FIGS. 4 and 5 illustrate the fasteners 100 in the unlocked position for releasing the connector 10 from the panel 12. Each fastener 100 may be easily removed by pushing inner pin member 104 inward with respect to outer sleeve housing 102 against the bias of spring 106 and toward the panel 12 to release the locking portion 112, thereby allowing the fastener 100 to be pulled out of the panel hole 14. More specifically, pushing inner pin member 104 toward the panel 12 and locking portion 112 of outer sleeve housing 102, such as by pushing on depression part 128 of head end 124, compresses spring 106 and moves locking end 126 of pin member 104 out of engagement with locking portion 112 and its fingers 118, as seen in FIG. 4. In this position, head end 124 abuts or come close to abutting the flange 114 of mount bushing portion 110. Once locking end 126 of pin member 104, and particularly its shoulder 132, is clear of the collapsible end or fingers 118 of outer sleeve housing 102, those fingers 118 can then collapse, thereby unlocking the fastener and allowing the installer to remove fastener 100 through the panel's hole 14 and connector 10 from panel 12.

A method of releasably mounting a connector to a panel according to the present invention using one or more fasteners 100 may comprise the steps of pushing head end 124 of inner pin member 104 toward locking portion 112 of outer sleeve housing 102, thereby compressing spring 106 until locking end 126 of inner pin member 104 is clear of the collapsible end 118 of outer sleeve housing 102. Fastener 100 can then be inserted through the mounting bore 16 of connector 10 and through the corresponding mounting hole 14 in the panel 12 such that collapsible end or fingers 118 is on a side of the panel 12 opposite mount bushing portion 110 of outer sleeve member 102, as best seen in FIG. 4. Once fastener 100 is inserted through the mounting hole 14 of the panel 12, head end 124 of inner pin member 104 may be released to allow spring 106 to expand and push head end 124 away from the panel 12 until locking end 126 of inner pin member 104 resides inside of collapsible end 118 of locking portion 112 of outer sleeve housing 102 to prevent collapse of locking portion 112, thereby locking fastener 100 and securing the connector 10 on the panel 12. Due to recessed areas 120a and 120b, when connector 10 is secured to panel 12, fastener 100 may float radially and axially in the space between outer sleeve housing 102 and mounting bore 16 of connector 10. This in turn advantageously provides radial and axial float to the connector 10 when mounted on panel 12.

While particular embodiments have been chosen to illustrate the invention, it will be understood by those skilled in the art that various changes and modifications can be made therein without departing from the scope of the invention as defined in the appended claims.

What is claimed is:

1. A fastener for mounting a connector to a panel, comprising:
    an outer sleeve housing having a mount bushing portion and a locking portion, the locking portion having a collapsible end; and
    an inner pin member received in the outer sleeve housing and axially moveable with respect to the outer sleeve housing between locked and unlocked positions, the inner pin member having a body with a head end that cooperates with the mount bushing portion of the outer sleeve housing and a locking end that cooperates with the locking portion of the outer sleeve housing,
    wherein when the inner pin member is in the unlocked position, the head end thereof abuts or comes close to abutting the mount bushing portion of the outer sleeve housing and the locking end thereof is clear of the collapsible end of the locking portion of the outer sleeve housing and the collapsible end is allowed to collapse, and when the inner pin member is in the locked position, the head end thereof is spaced from the mount bushing portion of the outer sleeve housing and the locking end thereof is received in the collapsible end of the outer sleeve housing, thereby preventing collapse of the collapsible end.

2. A fastener according to claim 1, further comprising a spring disposed in the mount bushing portion of the outer sleeve housing in association with the inner pin member, wherein the spring biases the inner pin member in the locked position.

3. A fastener according to claim 2, wherein the spring is compressed by the head end of the inner pin member toward the locking portion of the outer sleeve housing when the inner pin member is in the unlocked position, and the spring is extended when the inner pin member is in the locked position to push the head end away from the locking portion of the outer sleeve housing.

4. A fastener according to claim 1, wherein the collapsible end of the locking portion of the outer sleeve housing includes flexible fingers formed by longitudinal slots in the locking portion, and the locking end of the inner pin member includes a shoulder having outer diameter sized to prevent collapse of the flexible fingers when the locking end of the inner pin member is received in the locking position.

5. A fastener according to claim 1, wherein the mount bushing portion of the outer sleeve housing includes opposing first and second flanges, the first flange cooperates with the head end of the inner pin member when the inner pin member is moved between the locked and unlocked positions.

6. A fastener according to claim 5, wherein the outer sleeve housing includes an annular recessed area between the mount bushing portion and the locking portion of the outer sleeve housing.

7. A fastener according to claim 6, wherein the outer sleeve housing includes a stopping member having an outer diameter that is wider than the locking portion.

8. A connector assembly, comprising:
a connector having a housing with at least one mounting bore; and
at least one fastener receivable in the at least one mounting bore for mounting the connector to a panel, the at least one fastener including,
an outer sleeve housing having a mount bushing portion and a locking portion, the locking portion having a collapsible end; and
an inner pin member received in the outer sleeve housing and axially moveable with respect to the outer sleeve housing between locked and unlocked positions, the inner pin member having a body with a head end that cooperates with the mount bushing portion of the outer sleeve housing and a locking end that cooperates with the locking portion of the outer sleeve housing,
wherein when the inner pin member is in the unlocked position, the head end thereof abuts or comes close to abutting the mount bushing portion of the outer sleeve housing and the locking end thereof is clear of the collapsible end of the locking portion of the outer sleeve housing and the collapsible end is allowed to collapse, and when the inner pin member is in the locked position, the head end thereof is spaced from the mount bushing portion of the outer sleeve housing and the locking end thereof is received in the collapsible end of the outer sleeve housing, thereby preventing collapse of the collapsible end.

9. A connector assembly according to claim 8, further comprising a spring disposed in the mount bushing portion of the outer sleeve housing in association with the inner pin member, wherein the spring biases the inner pin member in the locked position.

10. A connector assembly according to claim 9, wherein the spring is compressed by the head end of the inner pin member toward the locking portion of the outer sleeve housing when the inner pin member is in the unlocked position, and the spring is extended when the inner pin member is in the locked position to push the head end away from the locking portion of the outer sleeve housing.

11. A connector assembly according to claim 9, wherein the collapsible end of the locking portion of the outer sleeve housing includes flexible fingers formed by longitudinal slots in the locking portion, and the locking end of the inner pin member includes a shoulder with an outer diameter sized to prevent collapse of the flexible fingers when the locking end of the inner pin member is received in the locking position.

12. A connector assembly according to claim 9, wherein the mount bushing portion of the outer sleeve housing includes opposing first and second flanges and the spring is disposed between the first and second flanges.

13. A connector assembly according to claim 12, wherein the first flange cooperates with the head end of the inner pin member when the inner pin member is moved between the locked and unlocked positions and the second flange cooperates with the housing of the connector at the at least one mounting bore.

14. A connector assembly according to claim 9, wherein the outer sleeve housing includes an annular recessed area between the mount bushing portion and the locking portion of the outer sleeve housing, the annular recessed area defining a space between the outer sleeve housing and the mounting bore of the connector that provides radial and axial float for the fastener inside of the mounting bore.

15. A connector assembly according to claim 14, wherein the outer sleeve housing includes a stopping member adjacent the annular recessed area, the stopping member having an outer diameter that is configured to be wider than a hole in the panel through which the fastener is inserted.

16. A method of mounting a connector to a panel, comprising the steps of:
using at least one fastener for mounting the connector to the panel, the fastener comprising an outer sleeve housing having a mount bushing portion with first and second flanges and a spring located therebetween, and a locking portion with a collapsible end, and an inner pin member received in the outer sleeve housing and axially moveable therein, and the inner pin member having a body with a head end and a locking end;
pushing the head end of the inner pin member toward the locking portion of the outer sleeve housing, such that the head end of the inner pin member abuts or comes close to abutting the first flange of the outer sleeve housing, thereby compressing spring until the locking end of the inner pin member is clear of the collapsible end of the outer sleeve housing;
after the step of pushing the head end of the inner pin member, inserting the fastener through a mounting bore of a connector and through a corresponding mounting hole in the panel such that the collapsible end of the locking portion of the outer sleeve housing is on a side of the panel opposite the mount bushing portion of the outer sleeve housing; and
after the step of inserting the fastener through the mounting hole of the panel, releasing the head end of the inner pin member, thereby allowing the spring to expand and push the head end away from the panel until the locking end of the inner pin member resides inside of the collapsible end of the locking portion of the outer sleeve housing to prevent collapse of the locking portion, thereby locking the fastener and securing the connector on the panel.

17. The method of claim 16, wherein the collapsible end includes flexible fingers formed by longitudinal slots in the locking portion, and the locking end of the inner pin member has a shoulder with an outer diameter sized to prevent collapse of the flexible fingers when the fastener is locked.

18. The method of claim 16, wherein the fastener floats in a space between the outer sleeve housing and the mounting bore of the connector that is defined by an annular recessed area located between the mount bushing portion and the locking portion of the outer sleeve housing.

19. The method of claim 16, further comprising, after locking the fastener, the step of pushing the head end of the inner pin member against the bias of the spring until the locking end of the inner pin member is clear of the collapsible end of the locking portion, thereby unlocking the fastener to release the connector mounted to the panel.

* * * * *